May 26, 1931.   C. E. CARPENTER   1,807,280
ELECTRIC MOTOR SPEED CONTROLLER
Original Filed April 2, 1927

INVENTOR
CHARLES E. CARPENTER
By:
ATTORNEY

Patented May 26, 1931

1,807,280

UNITED STATES PATENT OFFICE

CHARLES E. CARPENTER, OF HOPEWELL JUNCTION, NEW YORK

ELECTRIC MOTOR SPEED CONTROLLER

Application filed April 2, 1927, Serial No. 180,599. Renewed October 2, 1930.

This invention relates to an electric motor speed controller.

The object thereof is to provide a controller which will regulate an electric motor to maintain a low speed and which will have a positive and definite action in accordance with the motor speed.

Another object is to provide a controller which will regulate an electric motor to maintain a substantially constant low speed under variations in load.

Another object is to provide a controller which is simple and efficient and which may be readily and economically manufactured.

The speed controller as it has been employed in practice comprises a positive displacement fluid pump driven by the electric motor in accordance with the speed thereof, a fluid motor operated by continuous fluid pressure created by said pump and provided with a valve to control such pressure, and means operated by said fluid motor to control the speed of said electric motor.

A controller and system made in accordance with the invention is illustrated in the accompanying drawings in which the views are as follows.

Figure 1:
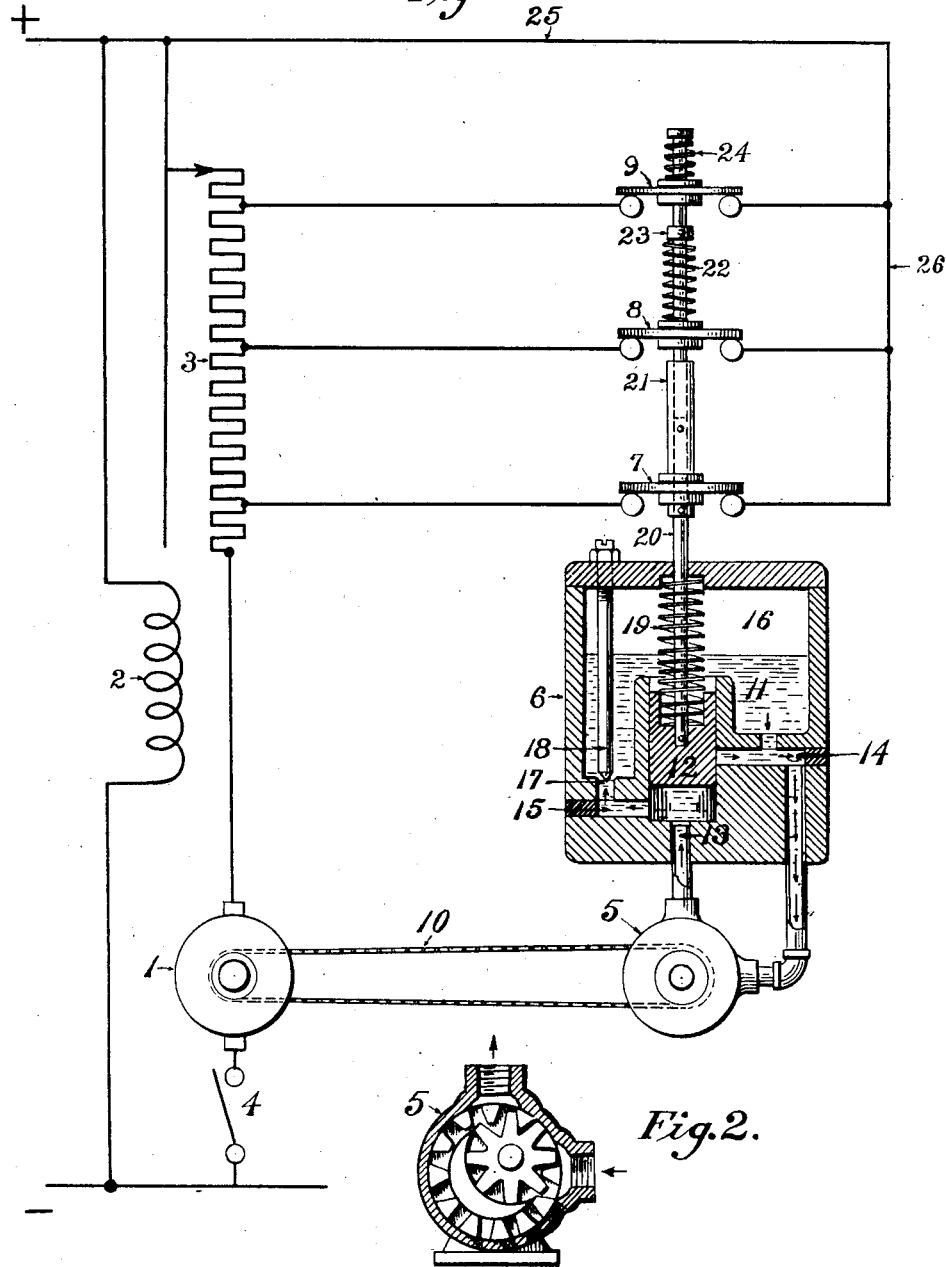
Fig. 1 illustrates the controller and a system in which it is employed.
Figure 2:
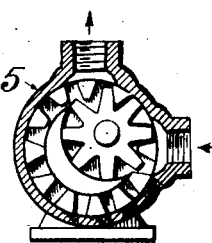
Fig. 2 is an interior view of a typical positive displacement fluid pump.

The motor which is to be regulated is provided with an armature 1 and a field 2.

The armature circuit is provided with an adjustable resistance 3 and a switch 4.

The controller comprises a positive displacement fluid pump 5 driven by the motor, a fluid motor 6 operated by fluid pressure created by the pump and switches 7, 8 and 9 operated by the fluid motor and controlling the resistance.

The pump is connected to the motor by a chain drive 10 or other means and thereby driven in direct accordance with the motor speed.

The fluid motor has a cylinder 11 and a piston 12 arranged therein.

The cylinder has an inlet port 13, an outlet port 14 and an escape port 15.

The pump has its discharge outlet connected to the cylinder inlet port and the cylinder has its outlet port connected to the pump supply inlet.

The escape outlet 15 communicates with an oil reservoir 16 which communicates with the cylinder outlet through a restricted port 17.

The escape port is controlled and restricted by an escape valve 18 which is threaded into the fluid motor casing so as to be adjustable.

The piston 12 is biased to its initial position by a spring 19.

When the pump operates at a low speed it circulates the oil from its outlet to the cylinder, then through the escape outlet to the oil reservoir and from the oil reservoir through the port 14 to the pump supply inlet.

When the motor attains a predetermined speed the pressure in the cylinder becomes sufficient to operate the piston against the spring.

The speed at which the piston will be moved depends upon the amount the escape port is restricted by its valve.

The piston also acts as a throttle-valve to control the cylinder outlet 14.

When the speed tends to become higher than the predetermined speed at which the piston is first operated, the cylinder outlet port 14 is partially opened by the piston and allows more oil to circulate.

The position which the piston assumes in the cylinder and the amount it opens the outlet port 14 depends upon the speed at which the motor tends to operate.

The fluid motor operates the switches 7, 8 and 9 through a rod 20 connected to the piston.

The switch 7 is fixed on the rod and moves therewith and the switches 8 and 9 are loose upon the rod.

These switches are all closed when the piston is in its initial position.

The switch 8 is operated by a collar 21 fixed upon the rod and normally biased to its closed position by a spring 22.

The switch 9 is operated by a collar 23 fixed upon the rod and biased to its closed position by a spring 24.

These collars are spaced a different distance from their respective switches.

When the piston advances, the switches are operated successively, the switch 7 being opened first by the rod 20, the switch 8 being opened next by the collar 21 and the switch 9 being opened finally by the collar 23.

The switches have their stationary contacts electrically connected in circuit to control the resistance 3 so that each switch controls a section of this resistance.

When the switch 4 is closed, the motor is started and the armature current flows from the positive line through conductor 25, conductor 26, switch 7, a resistance section, armature 1, and switch 4, to the negative line.

If the motor has a normal load, the fluid motor will operate the switch 7 to insert another resistance section and thereby limit the speed.

This switch may thereafter open and close to insert and remove resistance to maintain a substantially constant average speed.

If the motor has a lower load and tends to attain a higher speed, the switch 7 will remain open and the switch 8 will be opened to insert another resistance section and thereby limit the motor speed.

The switch 8 may thereafter open and close to insert and remove its resistance section to regulate the motor to maintain a substantially constant average speed.

If the motor has a still lower load and tends to attain a still higher speed, the switches 7 and 8 will remain open and the switch 9 will be opened to insert another resistance section.

The switch 9 may then open and close to insert and remove its resistance section to regulate the motor to maintain a substantially constant average speed.

When the motor has less than its normal load and its speed tends to increase above a predetermined speed, the piston opens the cylinder outlet port 14 and regulates the amount of oil that may pass therethrough.

The position which the piston then assumes and the amount it moves back and forth depends upon the speed the motor tends to attain.

The switches may assume various forms and be employed to control the resistance in different ways.

The controller may be adapted and applied to control either a direct or alternating current electric motor.

The invention which is set forth herein and defined in the appended claims may be modified and embodied in many different ways.

The invention is hereby claimed as follows:

1. An electric motor controller comprising a fluid pump driven in accordance with the motor speed, a fluid motor operated by continuous fluid pressure created by said pump, a valve operated in accordance with the pressure created by the pump to control the pressure operating said fluid motor, a switch operated by said fluid motor, and means controlled by said switch for regulating the electric motor to control the speed thereof.

2. An electric motor controller comprising a fluid pump driven in accordance with the motor speed, a fluid motor operated by continuous fluid pressure created by said pump, a valve operated in accordance with the pressure created by the pump to control the pressure operating said fluid motor, switches operated successively by said fluid motor, and means controlled by said switches for regulating the electric motor to control the speed thereof.

3. An electric motor controller comprising a fluid pump driven in accordance with the motor speed, a fluid motor operated by continuous fluid pressure created by said pump and having a restricted passage for free circulation of the fluid, a valve controlling said restricted passage, a valve operated in accordance with the pressure created by said pump to control the pressure applied to said fluid motor, a switch operated by said fluid motor, and means controlled by said switch for regulating the electric motor to control the speed thereof.

4. An electric motor controller comprising a fluid pump driven in accordance with the motor speed, a fluid motor operated by continuous fluid pressure created by said pump and having a restricted passage for free circulation of the fluid, a valve controlling said restricted passage, a valve operated in accordance with the pressure created by said pump to control the pressure applied to said fluid motor, switches operated successively by said fluid motor, and means controlled by said switches for regulating the electric motor to control the speed thereof.

5. An electric motor controller comprising a fluid pump driven in accordance with the motor speed, a fluid motor operated by continuous fluid pressure created by said pump, a valve operated in accordance with the pressure created by the pump to control the pressure operating said fluid motor, switches operated successively by said fluid motor, and means controlled by said switches for regulating the electric motor to control the speed thereof.

6. An electric motor controller comprising a fluid pump driven in accordance with the motor speed, a fluid motor having a cylinder and a piston and provided with an outlet port communicating with the supply inlet of said pump and controlled by said piston, a switch operated by said piston, and means controlled by said switch for regulating the electric motor to control the speed thereof.

7. An electric motor controller comprising a fluid pump driven in accordance with the motor speed, a fluid motor having a cylinder and a piston and provided with an outlet port communicating with the supply inlet of said pump and controlled by said piston, switches operated successively by said piston, and means controlled by said switches for regulating the electric motor to control the speed thereof.

8. An electric controller comprising a fluid motor operated by continuous fluid pressure, means to create a variable fluid pressure to operate said fluid motor, means operated in accordance with said fluid pressure to control the pressure applied to said fluid motor, and means operated by said fluid motor to control electric current.

9. A dynamo electric machine controller comprising a fluid motor operated by continuous fluid pressure, means to create a variable fluid pressure to operate said fluid motor, means operated in accordance with said fluid pressure to control the pressure applied to said fluid motor, and means operated by said fluid motor to control a dynamo electric machine.

10. A dynamo electric machine controller comprising a fluid pump driven in accordance with the speed of a dynamo electric machine, a fluid motor operated by continuous fluid pressure created by said fluid pump, means operated in accordance with the fluid pressure to control the pressure applied to said fluid motor, and means operated by said fluid motor to control a dynamo electric machine.

11. A dynamo electric machine controller comprising a fluid pump having a restricted passage connecting its inlet and outlet to allow free circulation of the fluid, a fluid motor operated by continuous fluid pressure created by said pump, means operated in accordance with the fluid pressure to control the pressure applied to said fluid motor, and means operated by said fluid motor to control a dynamo electric machine.

12. An electric motor controller comprising a fluid pump driven in accordance with the motor speed and having a restricted passage connecting its inlet and outlet to allow free circulation of the fluid, a fluid motor operated by continuous fluid pressure created by said pump, means operated in accordance with the fluid pressure to control the pressure applied to said fluid motor, and means operated by said fluid motor to control the motor speed.

13. An electric controller comprising a fluid pump, a cylinder having fluid under pressure supplied thereto by said pump, a piston arranged within said cylinder and operated by said fluid, means to allow continuous circulation of the fluid through the pump and said cylinder, means controlled by said piston to control the fluid pressure within said cylinder, and means operated by the piston to control electric current.

14. A dynamo electric machine controller comprising a fluid pump, a cylinder having fluid under pressure supplied thereto by said pump, a piston arranged within said cylinder and operated by said fluid, means to allow continuous circulation of the fluid through the pump and said cylinder, means controlled by said piston to control the fluid pressure within said cylinder, and means operated by the piston to control a dynamo electric machine.

15. An electric motor controller comprising a fluid pump, a cylinder having fluid under pressure supplied thereto by said pump, a piston arranged within said cylinder and operated by said fluid, means to allow continuous circulation of the fluid through the pump and said cylinder, means controlled by said piston to control the fluid pressure within said cylinder, and means operated by the piston to control an electric motor.

16. An electric motor controller comprising a fluid pump driven in accordance with the motor speed, a cylinder having an escape outlet for the fluid from said pump to return to said pump, a piston arranged within said cylinder to be operated by continuous fluid pressure created by said pump, a valve operated by said fluid pressure to control the pressure applied to said piston, and a switch operated by said piston to control means for regulating the speed of an electric motor.

17. An electric motor controller comprising a fluid pump driven in accordance with the motor speed, a cylinder having an escape outlet for the fluid from said pump to returned to said pump, a piston arranged within said cylinder to be operated by continuous fluid pressure created by said pump, a valve operated by said fluid pressure to control the pressure applied to said piston, and switches operated in succession by said piston to control means for regulating the speed of an electric motor.

In witness whereof, I have hereunto subscribed my name.

CHARLES E. CARPENTER.